United States Patent
Cory et al.

(10) Patent No.: US 10,102,549 B1
(45) Date of Patent: Oct. 16, 2018

(54) SYSTEMS AND METHODS OF DYNAMIC OPTIMIZATION OF VIEWABILITY RATE UTILIZING PRE-BID CLIENT-SIDE DETECTION

(71) Applicant: Adap.tv, Inc., San Mateo, CA (US)

(72) Inventors: Amir Cory, Palo Alto, CA (US); Garrett Badeau, Redwood City, CA (US)

(73) Assignee: Millennial Media LLC, Baltimore, MD (US)

( * ) Notice: Subject to any disclaimer, the term of this patent is extended or adjusted under 35 U.S.C. 154(b) by 416 days.

(21) Appl. No.: 14/843,456

(22) Filed: Sep. 2, 2015

(51) Int. Cl.
 *G06Q 30/00* (2012.01)
 *G06Q 30/02* (2012.01)
(52) U.S. Cl.
 CPC ..... *G06Q 30/0275* (2013.01); *G06Q 30/0242* (2013.01)
(58) Field of Classification Search
 None
 See application file for complete search history.

(56) References Cited

U.S. PATENT DOCUMENTS

| | | | | |
|---|---|---|---|---|
| 9,280,785 | B1* | 3/2016 | Jain | G06Q 30/0243 |
| 2002/0144233 | A1* | 10/2002 | Chong | G06F 8/20 |
| | | | | 717/105 |
| 2004/0186776 | A1* | 9/2004 | Llach | G06Q 30/02 |
| | | | | 705/14.66 |
| 2007/0050241 | A1* | 3/2007 | Jones | G06Q 30/02 |
| | | | | 705/14.71 |
| 2007/0150509 | A1* | 6/2007 | Lev | G06F 9/466 |
| 2011/0029983 | A1* | 2/2011 | Lu | G06Q 10/0631 |
| | | | | 718/105 |
| 2011/0082755 | A1* | 4/2011 | Itzhak | G06Q 30/02 |
| | | | | 705/14.69 |
| 2012/0256915 | A1* | 10/2012 | Jenkins | G06T 15/40 |
| | | | | 345/419 |
| 2013/0215115 | A1* | 8/2013 | Jenkins | G06T 15/20 |
| | | | | 345/420 |
| 2013/0219281 | A1* | 8/2013 | Trevelyan | G06F 17/30864 |
| | | | | 715/738 |

(Continued)

*Primary Examiner* — Matthew T Sittner
(74) *Attorney, Agent, or Firm* — Shook, Hardy & Bacon L.L.P.

(57) ABSTRACT

In various embodiments, methods and systems for optimizing viewability rates by utilizing pre-bid client-side detection in autonomous bid-decisioning for advertising campaigns is provided. When provided with a unitary demand-side platform and sell-side platform system, advertisers may employ aspects of the present disclosure to pose a significant advantage in optimizing viewability rates for exchange sites purchased on the open digital advertising market. An advertiser, by way of the unitary demand-side and sell-side platform, can determine that runtime pre-bid viewability data corresponding to an exchange site is available. Based on the runtime pre-bid viewability data and historical performance data corresponding to the exchange site, an optimized calculation can be made to infer a substantially high likelihood of viewability if the exchange site is ultimately purchased by the advertiser. This optimized autonomous bid-decisioning can provide a significant advantage to advertisers in meeting their advertising campaign goals.

17 Claims, 6 Drawing Sheets

(56) References Cited

U.S. PATENT DOCUMENTS

| | | | |
|---|---|---|---|
| 2013/0298192 A1* | 11/2013 | Kumar | G06F 21/52 |
| | | | 726/3 |
| 2014/0019262 A1* | 1/2014 | Reitsma | G06Q 30/02 |
| | | | 705/14.71 |
| 2014/0025509 A1* | 1/2014 | Reisz | G06Q 30/0275 |
| | | | 705/14.71 |
| 2014/0136336 A1* | 5/2014 | Mak | G06Q 30/0275 |
| | | | 705/14.71 |
| 2014/0303953 A1* | 10/2014 | Bates | G06Q 30/02 |
| | | | 703/13 |
| 2014/0325055 A1* | 10/2014 | Oh | H04L 67/22 |
| | | | 709/224 |
| 2014/0374478 A1* | 12/2014 | Dearing | G06Q 10/0833 |
| | | | 235/385 |
| 2015/0106813 A1* | 4/2015 | Mihalocivi | H04L 47/125 |
| | | | 718/1 |
| 2015/0269770 A1* | 9/2015 | Jenkins | G06T 15/40 |
| | | | 345/421 |
| 2015/0310484 A1* | 10/2015 | Haile | G06Q 30/0246 |
| | | | 705/14.45 |
| 2015/0373153 A1* | 12/2015 | Jenkins | A63F 13/355 |
| | | | 709/203 |

* cited by examiner

SYSTEMS AND METHODS OF DYNAMIC OPTIMIZATION OF VIEWABILITY RATE UTILIZING PRE-BID CLIENT-SIDE DETECTION

BACKGROUND

Advertisers traditionally pay for web advertisement space under what is generally known in the industry as the "cost-per-impression" (CPI) methodology. In other words, advertisers are paying based on the number of times their advertisements are fetched and loaded on a web page. It may be difficult, however, for an advertiser to determine whether their advertisements are actually being viewed and/or are visible to the end-user. To this end, advertisers may be paying for impressions that are never viewed by, or even visible to, the end-user. For instance, the advertisements may be filtered by ad-blocking software, maliciously hidden within a webpage by the publisher, hidden under multiple web-browser tabs open by the end-user, and the like. As such, advertisers may prefer a payment methodology based on the number of times the advertisement is actually viewable to the end-user, rather than the number of times the advertisement is merely fetched and loaded on the web page by the end-user's computing device.

To purchase web advertisement space in view of an advertising campaign, advertisers can bid on the space using a programmatic instantaneous auctioning process. On a high level, advertisers can set bid amounts to automatically bid on each ad impression as it is served. Some advertisers can employ logic algorithms to optimize adjustments of their bid amounts based on a calculated probability of viewability. These advertisers, however, are limited to basing their optimization logic on historical performance data associated with the advertising space. In this regard, the probability of viewability associated with the advertising space is still solely dependent on stale data, which cannot ensure a high probability of viewability at the time the impression is being served.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

While most advertisers have limited access to historical performance data associated with a particular advertising space from a third-party advertising exchange, some advertisers can be configured as, or have access to, both the advertiser platform and the advertising exchange platform. That is, some advertisers can be configured to bid on advertisement space that is auctioned off on their own advertising exchange. While these advertisers must continue to compete for advertising space on their own exchange, in some circumstances, they may also be provided access to runtime pre-bid viewability data corresponding to the advertising space.

As such, embodiments of the present invention provide methods and systems for optimizing viewability rates by utilizing pre-bid client-side detection in autonomous bid-decisioning for advertising campaigns. The advertiser must determine that runtime pre-bid viewability data corresponding to an advertising space is available. The runtime pre-bid viewability data and the historical performance data is then accessed in accordance with determining that the runtime pre-bid viewability data is available. Based on, among other things, the runtime pre-bid viewability data and the historical performance data corresponding to the advertising space, an impression level performance value for the advertising space is determined. A bid price is then generated for placing an advertisement on the advertisement space based on the determined impression level performance value.

BRIEF DESCRIPTION OF THE DRAWINGS

The present invention is described in detail below with reference to the attached drawing figures, wherein.

DETAILED DESCRIPTION

Figure 1:
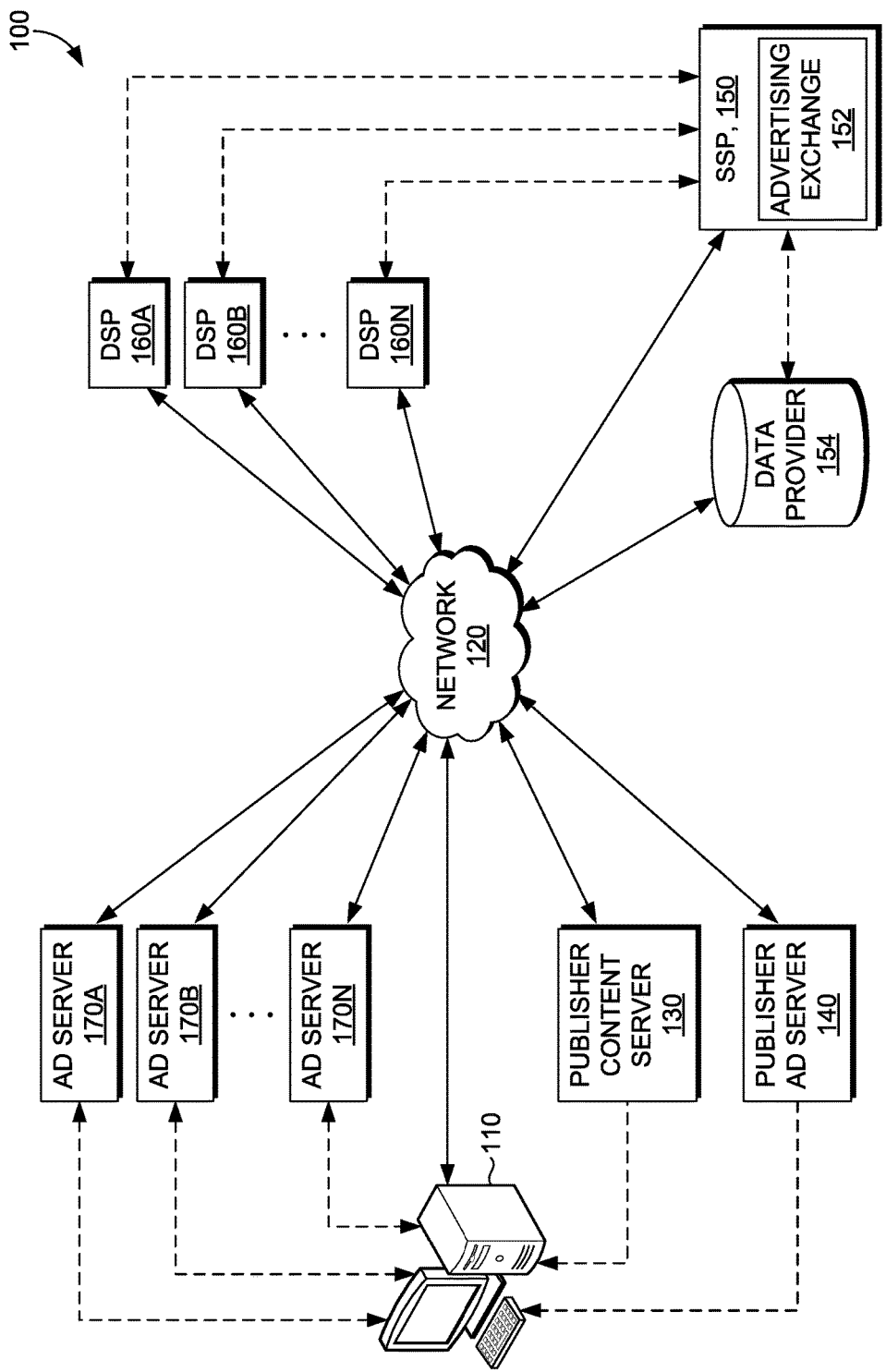
FIG. 1 is a block diagram of an exemplary operating environment in which embodiments described herein may be employed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Web advertisement space is typically sold by an owner of an advertising medium (also referred to herein as a "publisher") under an automated real-time bidding system. The publisher can be a web site owner, an application developer, or any controlling entity of any electronic advertising medium. Publishers are generally the providers of content, such as news, articles, blogs, and electronic media, among other things, which can attract a number of interested end-users. The publishers may, as a revenue-generating scheme, sell advertisement space on their advertising mediums. The advertising medium, as described herein, can be a website, an application, an electronic media, an electronic billboard, and the like, configured to display publisher content. Publishers may also sell predefined advertising space (also referred to herein as "exchange sites") positioned on the advertising medium, typically positioned alongside the publisher content.

When end-users access the advertising mediums (i.e., visit a webpage with a web browser application), the publisher's content begins to render on the end-user's device. As the content renders, one or more exchange sites available on the advertising medium can be configured to request an advertisement. The request, in some embodiments, can include information about the end-user. For instance, the request may include an inventory attribute, client data, or user data, as will be described herein in more detail. The request can be sent to the publisher's ad server to decide which advertisement will populate the exchange site. As will be used herein, the term "ad" will be used in reference to "advertisement", "advertising", or "advertiser", as may be appreciated by one of ordinary skill in the art. In some aspects, the end-user information associated with the request can influence which advertisement is selected for populating the exchange site, and from where.

The exchange site can be populated with an advertisement received from one of a variety of sources. In some instances, the advertisement can be reserved for specific advertisers associated with the publisher (i.e., advertisers who have a prearranged agreement to advertise on the exchange site based on end-user information associated with the request). In this regard, the publisher's ad server will select the advertisement based on the end-user information associated with the request, and populate the reserved exchange site with the advertisement.

In some other instances, the publisher's ad server may place the opportunity to advertise on the exchange site onto the open market. In this case, the publisher's ad server can be configured to connect to a server-side platform (also referred to herein as a "SSP"). Similar to the publisher's ad server, the SSP can also be configured to gather and/or analyze end-user information associated with the request. In addition to the information associated with the request, the SSP may determine, among other things, whether the end-user has been associated with previous requests, or may retrieve additional data about the end-user by conferring with a data provider, as will be described.

In some embodiments, the SSP can be configured to determine whether the particular exchange site is currently viewable. Under a standard proposed by the Interactive Advertising Bureau® (IAB®), an exchange site can be determined as viewable if it is at least fifty percent visible to the end-user for at least one second. In this regard, the SSP can be configured to, in some instances, retrieve runtime pre-bid viewability data from the end-user to determine whether the at least fifty percent of the exchange site is visible to the end-user. In more detail, the determination of an exchange site's viewable state can be made, for instance, using JavaScript®, ActiveX®, or other real-time scripting language on the end-user's device or application running on the end-user's device for viewing the advertising medium. The real-time scripting language can be employed to determine that at least fifty percent of the pixel area defined by the exchange site, of which 100% of the advertisement may occupy, is currently within the visible bounds (e.g., the currently visible portion in an active browser tab, or the floating, non-hidden area) of the advertising medium.

Using this information, the SSP can also be configured to log or store historical performance data corresponding to an exchange site. In other words, the SSP can analyze viewability data of a particular exchange site over a duration of time, and in some instances, provide this viewability data to advertisers in the form of historical performance data corresponding to the exchange site, as will be described. In some embodiments, the SSP can analyze the historical performance data of the exchange site in relation to information about the end users. For instance, and by way of example only, the performance data for the particular exchange site collected over the past seven days may indicate that men living in the South and having a household income of less than $40,000 have a high viewability rate. In this regard, the historical performance data of the exchange site, in some instances, can be made available to advertisers for accessing and optimizing bid-decisioning techniques, as will be described.

Based on end-user information gathered by the SSP, the SSP can be configured to then send the request for advertising on the exchange site to an ad exchange. In some embodiments, the SSP can also be configured to operate as the ad exchange. The ad exchange and/or SSP can be configured to communicate with one or more potential buying systems, including demand-side platforms (also referred to herein as a "DSP"). In some embodiments, DSPs can be configured to set pre-cached rules for purchasing advertisements from SSPs if the end user's request meets particular criteria (e.g., end-user's household income is determined to be greater than $75,000) typically defined by the goals of the advertiser's advertising campaign. In this regard, advertisers, by way of DSPs, can set a pre-cached rule to purchase a predefined number of advertisements for a predefined amount, as long as the end-user information associated with the request is in accordance with predefined criteria. The predefined criteria can be, for example, end-users falling within a particular demographic class.

In other embodiments, the ad exchange and/or SSP can be configured to offer the exchange site up for auction to one or more DSPs or other buying platforms. The process of placing the exchange site up for sale and receiving a return bid request typically occurs in about ten milliseconds. In this regard, it is contemplated that DSPs may employ autonomous bid-decisioning in their systems for making return bid requests in response to the ad exchange and/or SSP's auctioning of an exchange site. As was described, the DSPs can access historical performance data of the exchange site from the SSP to optimize autonomous bid-decisioning algorithms.

On a high level, the ad exchange and/or SSP may then select the highest bid for the exchange site. In return, the advertiser, by way of the DSP, will send the ad exchange and/or SSP with instructions detailing how and/or where the advertisement can be retrieved. The SSP can be configured to then send the instructions to the publisher's ad server, which can then instruct the end-user's device or application for viewing the advertising medium to render the advertisement retrieved using the instructions provided thereto.

As was described, DSPs may be provided with access to historical performance data of an exchange site from a third-party SSP to optimize autonomous bid-decisioning algorithms, as will be described in reference to FIG. 3. Typically, DSPs analyze the last seven days of the historical performance data to determine a likelihood of viewability if the exchange site is purchased for placement of an advertisement. Unfortunately, this technique only demonstrates about 60% average accuracy for viewability optimization in most instances. The reason for the low rate of accuracy can be attributed to the fact that the historical performance data is just that, historical. The fact that the viewability of a particular exchange site is already completed and passed, does not particularly help the advertiser at the time of the prospective impression. Although the historical performance data may point to a likelihood of viewability of the exchange site in light of the historical performance data, in many instances, the data is generally stale and determined to be completely off base.

On the contrary, the runtime pre-bid viewability data, utilized by the SSP for generating the historical performance data, has demonstrated a 90% average accuracy for viewability. To provide some context, as was described, the runtime pre-bid viewability data can determine whether the particular exchange site being proposed for sale is currently viewable to the end-user. While this data has traditionally been logged and made available to advertisers for viewability analyses and bid optimization, the runtime pre-bid viewability data itself has not been made available. Reasons why this information has not been made available may include, among other reasons: (1) not all publishers provide runtime pre-bid viewability data, or (2) the current configuration in which web advertising sales is made has not considered the communication and analysis of runtime viewability data.

As such, embodiments of the present disclosure provide for a competitive advantage to advertisers that employ a unified SSP and DSP platform, as will be described in reference to FIG. 4. That is, some advertisers may have control and/or access to both the SSP and the DSP, through which they conduct business. In this regard, advertisers may consider the runtime pre-bid viewability data, the historical performance data, or any combination thereof, to optimize their autonomous bid-decisioning algorithm. In some embodiments, the advertisers or DSPs may rely solely on the runtime pre-bid viewability data if determined that the runtime pre-bid viewability is available. In some other embodiments, the advertisers or DSPs may analyze both the runtime pre-bid viewability data and the historical performance data to influence their bid-decisioning processes, as will be described herein in more detail.

Referring now to FIG. 1, FIG. 1 illustrates an exemplary operating environment 100 in which implementations of the present disclosure may be employed. In particular, FIG. 1 shows a high level architecture of the operating environment 100 using components in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the operating environment 100 includes at least an end-user computing device 110, a public network 120, a publisher content server 130, a publisher ad server 140, an SSP 150, an advertising exchange 152, a data provider 154, one or more DSPs 160a, 160b, 160n, and one or more ad servers 170a, 170b, 170n. These components may communicate with each other via network 110, which may include, without limitation, one or more local area networks (LANs) and/or wide area networks (WANs). In exemplary implementations, network 120 comprises the Internet and/or a cellular network, amongst any of a variety of possible public and/or private networks. Any number of nodes (e.g., SSP 150, DSP 160a-n, publisher content server 130, publisher ad server 140, data provider 154) and end-user computing device 110 may be employed within the operating environment 100 within the scope of implementations of the present disclosure. Each of the components shown in FIG. 1 may be implemented via any type of computing device, such as computing device 700 described in connection to FIG. 7, for example.

It should be understood that any number of user devices, servers, nodes, and data sources may be employed within operating environment 100 within the scope of the present disclosure. Each may comprise a single device or multiple devices cooperating in a distributed environment. For instance, publisher content server 130 may be provided via multiple devices arranged in a distributed environment that collectively provide the functionality described herein. Additionally, other components not shown may also be included within the distributed environment.

The end-user computing device, hereinafter also referred to as "user device," can be client devices on the client-side of the operating environment 100, while nodes (e.g., SSP 150, DSP 160a-n, publisher content server 130, publisher ad server 140, data provider 154) can be on the server-side of operating environment 100. The aforementioned nodes can comprise server-side software designed to work in conjunction with client-side software on user device 110 so as to implement any combination of the features and functionalities discussed in the present disclosure. This division of operating environment 100 is provided to illustrate one example of a suitable environment, and there is no requirement for each implementation that any combination of nodes and user device 110 remain as separate entities.

End-user computing device 110 may comprise any type of computing device capable of use by an end-user. For example, in one embodiment, user device 110 may be the type of computing device described in relation to FIG. 7 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Data provider 154 may comprise one or more data sources and/or data systems, which are configured to make data available to any of the various constituents of operating environment 100, or systems 300,400 described in connection to FIGS. 3 and 4. For example, in one embodiment, one or more data sources 154 may provide (or make available for accessing) exchange site data to SSP 150 of FIG. 1. Data provider 154 may be discrete from SSP 150 or may be incorporated and/or integrated therein.

As was described previously, the end-user computing device 110 may be configured to, or may include an application (not shown) configured to display at least portions of an advertising medium provided by a publisher. The application may be a web browser, a desktop or mobile application, or other software configured to display at least portions of the advertising medium. The advertising medium can be a website, a portion of the user interface on the desktop or mobile application, or other portion of a medium presented by software utilized by the end-user.

Figure 2:
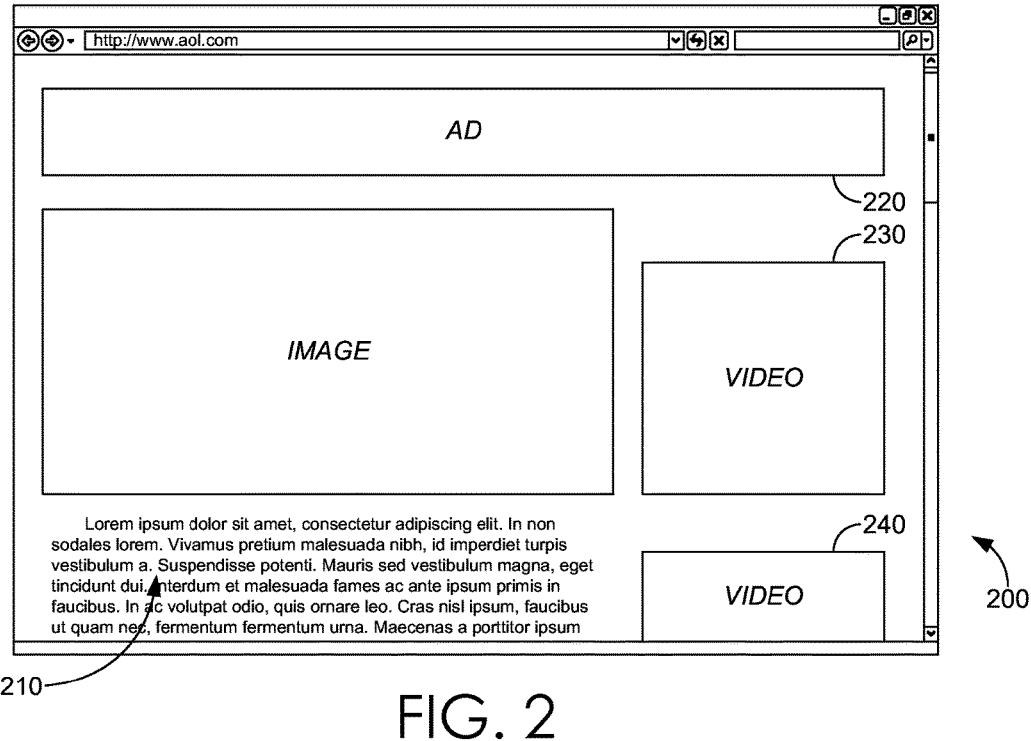
FIG. 2 is an illustration of an exemplary advertising medium having a plurality of exchange sites provided therein, in accordance with embodiments described herein.

The end-user computing device 110 can request, from a publisher content server 130, content on a medium that is otherwise referred to herein as an advertising medium. The content comprises information provided by the publisher that is displayed on the advertising medium (e.g., a webpage). Upon receiving the request to receive content, the publisher content server 130 can return the requested content, typically in the form of code, to the end-user computing device 110 over the network 120. The content, in the form of code, is then interpreted by the end-user computing device 110 or application thereon, for rendering on the display of the end-user computing device 110. On the advertising medium (e.g., the website), however, the publisher may provide spaces available for advertising, referred to herein as exchange sites. For instance, FIG. 2 includes, by way of example only, exchange sites 220, 230, and 240, each operable to receive and display an advertisement as part of the webpage 210. In the code corresponding to the exchange site(s), instructions are provided to the end-user computing device 110 or application thereon to generate a request to the publisher ad server 140 to decide, using built-in logic, which advertisement(s) should be displayed within the exchange site(s) based on information extracted from the request. As the request is generated on the end-user computing device 110, a variety of information can be included with the request, as will be described.

The information extracted or extrapolated from the request can include, among other things, inventory attributes, client data, and user data. In more detail, inventory attributes can include, among other things, an identifier associated with the exchange site, a domain and/or subdomain associated with the exchange site (in other words, where the exchange site is available), the size of the advertisement space or exchange site, an indication whether the content is premium content, an indication whether the advertisement is user-initiated, a price associated with the exchange site, or a topic associated with the advertising medium. The client data can include, among other things, information about the browser (e.g., name, version, state), operating system (e.g., name, version, state), end-user device (e.g., name, model, company), a temporal factor (e.g., time of day, day of week, holiday, etc.), or a geographic location associated with the end-user device. The user data can include, among other things, various data segments determinable from the request. For instance, user data may include demographic information including end-user annual income, gender, geographic location, browsing history, likes and dislikes, etc. As one of ordinary skill in the art may appreciate, information from the request can either be received directly from the end-user device, or extrapolated, for instance, by data provider 154 of FIG. 1, by associating request information from historical request information (e.g., browser cookies, etc.). For instance, the data provider 154 can extrapolate, based on information received from the request, more information about the end-user using historical data collected about the end-user.

In embodiments described herein, the publisher ad server 130 can communicate the request to an SSP 150, which is configured to monetize a plurality of publishers' exchange site inventory. At this time, the SSP 150 can be configured to analyze the request to determine additional information about the end-user (e.g., whether the end-user is a repeating visitor, or additional information about the end-user based on browsing history, statistical analyses, logged information, etc.). The additional information about the end-user can be extrapolated using data from, for instance, data provider 154. Using information from the request and the determined additional information, the SSP 150 can communicate the aforementioned request and additional info to an advertising exchange 152. While illustrated as a subcomponent of SSP 150 in FIG. 1, it is contemplated that the advertising exchange 152 can be an entirely separate component or entity from SSP 150.

The SSP 150 and/or advertising exchange 152 can then communicate the request and determined additional information to a plurality of DSPs 160a, 160b, and 160n. In other words, the SSP 150 and/or advertising exchange 152 can be configured to place the exchange site up for auction, including the criteria defined by the determined additional information about the end-user, so that the plurality of DSPs 160a, 160b, and 160n can bid on the exchange site for purchase. As can be appreciated, if the criteria defined by the request and additional information targets a particular classification of end-user sought by the advertising campaign of the advertiser, it is likely that the bid price will increase in conjunction with the advertiser's desire to target that end-user. In embodiments described herein, the process of auctioning, bidding, and determining a winning bid, all takes place in about ten milliseconds of time. As will be described with reference to FIG. 3 and FIG. 4, various factors may be considered by the advertisers, by way of the DSPs 160a, 160b, and 160n, when determining a bid price for the auctioned exchange site.

Moving forward, once a winning bid is determined by the SSP 150, the winning DSP 160a, 160b, or 160n passes instructions for retrieving the winning advertisement to the advertising exchange 152 and/or SSP 150, which in turn, passes the instructions to the publisher ad server 140. Then, the publisher ad server 140 responds to the end-user computing device 110 and/or application thereon, to retrieve the advertisement of the winning DSP using the provided instructions that point to the appropriate agency ad server 170a, 170b, or 170n. The agency ad server then receives the request, from the end-user computing device 110 and/or application thereon, to supply the advertisement. The ad server 170a, 170b, or 170n is configured to record the request as an impression, and then communicate the advertisement to the end-user computing device 110 for rendering on the exchange site.

Having described various aspects of the operating environment 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure.

Figure 3:
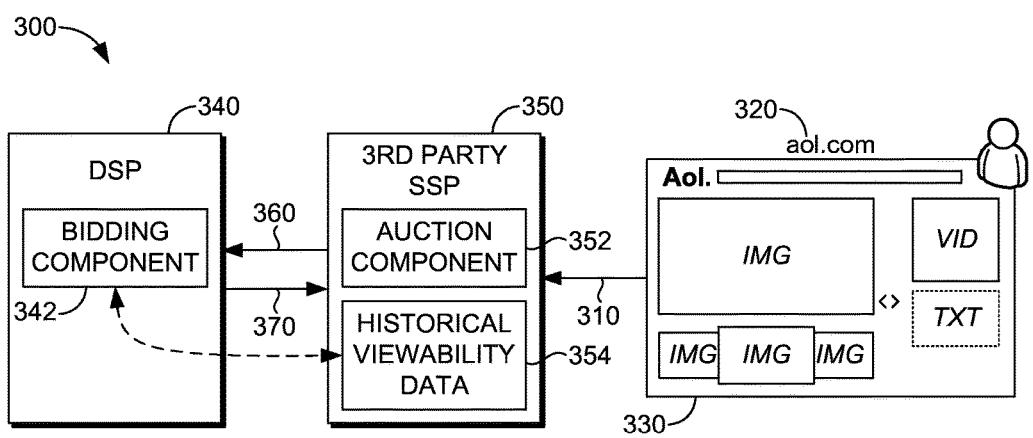
FIG. 3 is a block diagram of an exemplary DSP/third-party SSP system, in accordance with embodiments described herein.

With reference to FIG. 1 and FIG. 3, a traditional DSP/third-party SSP system 300 is illustrated. As was described, the third-party SSP 350 can be responsible for receiving 310, from one or more publishers 320, opportunities for advertising on their advertising medium 330. As illustrated on FIG. 3, a traditional configuration of a DSP 340 and third-party SSP 350 is provided on a high level. That is, the third-party SSP 350 is configured to receive 310 the advertising opportunity from a publisher 320, and process the advertising opportunity (also known as the exchange site) through the auction component 352. The auction component 352 can, as described with SSP 150 and advertising exchange 152 of FIG. 1, gather more information about the request and end-user associated therewith, to then request 360 bids from one or more DSPs 340.

Each of the one or more DSPs 340 can be configured to include a bidding component 342 that may employ an autonomous bid-decisioning algorithm configured to optimize the likelihood that the impression, if purchased at a calculated price, is "viewable" to the end-user, as defined by the IAB®. The autonomous bid-decisioning algorithm may adjust the calculated price based on, among other things, a likelihood of viewability and whether or not the end-user is a targeted genre subject to goals defined by the advertiser's advertising campaign. The likelihood of viewability, calculated by the bidding component 342, is received using historical viewability data 354 associated with the exchange site. As was described herein above, historical viewability data 354 can be stored on an ongoing basis by the third-party SSP 350, and made available for auditing by the DSP 340. In some instances, the historical viewability data 354 can be received using runtime pre-bid viewability data, as was described herein. However, in this system 300, the runtime pre-bid viewability data is limited for purposes of generating the historical viewability data 354. In this regard, the bidding component 342 can retrieve historical viewability data 354 from the SSP 350 to influence its decisions when calculating bids with the intention of improving viewability of advertisement impressions. Based on the analysis of the historical viewability data 354, the DSP 340 can then respond 370 to the bid request, using the bid calculated by bidding component 342, which will then be processed by the SSP 350 to determine a winning bid.

Figure 4:
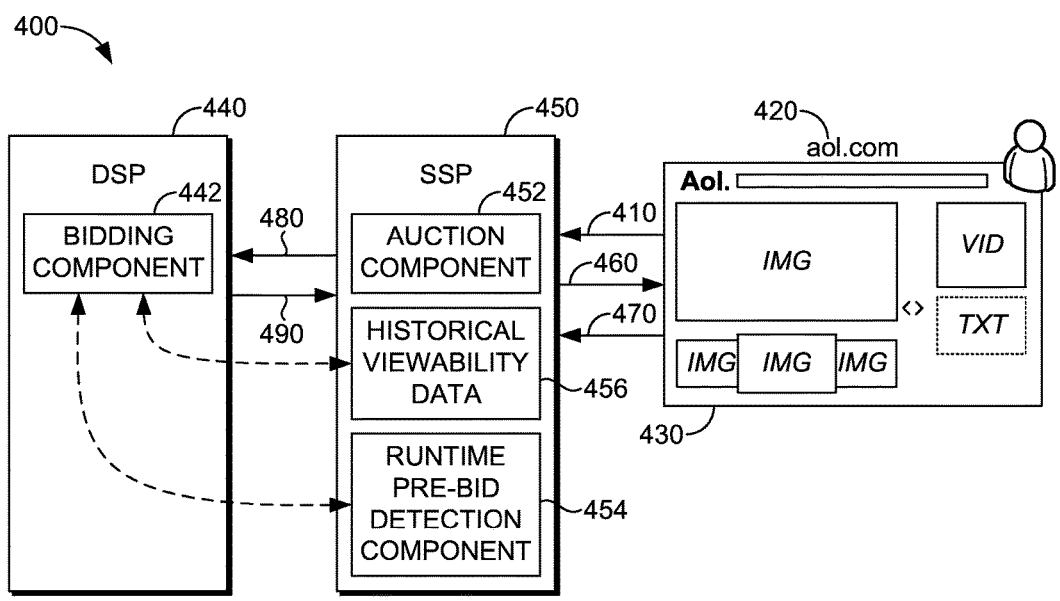
FIG. 4 is a block diagram of an exemplary unitary DSP/SSP system, in accordance with embodiments described herein.

Moving now to FIG. 4, with reference to FIG. 1 and FIG. 4, the advantageous configuration of a unitary SSP/DSP system 400 is illustrated. Similar to that of FIG. 3, the commonly-owned or commonly-accessible "unitary" SSP 450 can be responsible for receiving 410, from one or more publishers 420, opportunities for advertising on their advertising medium 430. As illustrated on FIG. 4, a unitary configuration 400 of a DSP 440 and SSP 450 is provided on a high level. That is, the unitary SSP 450 is configured to receive 410 the advertising opportunity, or exchange site, from a publisher 420, and process the advertising opportunity (also known as the exchange site) through the auction component 452. The auction component 452 can, as described in reference to SSP 150 and advertising exchange 152 of FIG. 1, gather more information about the request and end-user associated therewith, to then request 480 bids from one or more DSPs 440.

The unitary DSP/SSP system 400 is particularly unique, however, in that the SSP 450 can be configured to include a runtime pre-bid detection component 454. The runtime pre-bid detection component 454 can be configured to determine 460 whether runtime pre-bid viewability data corresponding to the exchange site is available. That is, the runtime pre-bid detection component 454 can interface with various advertising mediums through, for instance, publisher content server 130 or publisher ad server 140 of FIG. 1, to determine 460 whether the exchange site is considered viewable in accordance with industry or customized standards. As was described, scripting languages can be utilized on the end-user device or applications running thereon to determine whether any particular exchange site is determined as viewable at the time of rendering the advertising medium on the end-user's display. One of the publisher's content server 130, publisher ad server 140, or advertising medium (not shown) having a scripting language module configured thereon, can communicate 470, to the runtime pre-bid detection component 454, a verification that the exchange site is determined as viewable.

The unitary DSP 440 can be configured to include a bidding component 442 that may employ an autonomous bid-decisioning algorithm configured to optimize the likelihood that the impression, if purchased at a calculated price, is "viewable" to the end-user. The autonomous bid-decisioning algorithm may adjust the calculated price based on, among other things, a likelihood of viewability and whether or not the end-user is a targeted genre subject to the advertiser's advertising campaign. The likelihood of viewability calculated by the bidding component 442 is calculated using at least the historical viewability data 456 associated with the exchange site and runtime pre-bid viewability data communicated 470 from one of the publisher content server 130, publisher ad server 140, or advertising medium (not shown) having a scripting language module configured thereon.

As was described herein above, historical viewability data 456 can be stored on an ongoing basis by the unitary SSP 450 and made available for auditing by the DSP 440. In some instances, the historical viewability data 456 can be received using runtime pre-bid viewability data, as was described in some embodiments disclosed herein. In this unitary system 400, however, the runtime pre-bid viewability data is available both for the purposes of generating historical viewability data 456 and for use by the DSP 440 in determining at least a viewable state of the exchange site that is subject to the bid request. In this regard, the bidding component 442 can retrieve historical viewability data 456 and at least a viewable state (i.e., viewable or not viewable) from the runtime pre-bid detection component 454, by the SSP 450, to influence its decisions when calculating bids with the intention of improving viewability of advertisement impressions. In some embodiments, the influence derived from this information can affect an impression level performance value for the exchange site (e.g., a coefficient value) that may correlate directly to an advertising campaign budget, a likelihood of viewability, or a combination thereof, as will be described. Based on the analysis of the historical viewability data 456 and viewability state determined by runtime pre-bid detection component 454, the DSP 440 can then respond 490 to the bid request, using the bid calculated by bidding component 442, which will then be processed by the SSP 450 to determine a winning bid.

Optimization of the autonomous bid-decisioning algorithm, employed by the bidding component 442 when generating a bid in response to the bid request 480, can analyze a variety of predictor types associated with information collected from at least one of the historical viewability data 456 and the runtime pre-bid viewability data 456 to determine an impression level performance value for the exchange site. In more detail, the predictor types can include, among other things, inventory attributes, client data, and user data. As was described herein above, inventory attributes can include, among other things, an identifier associated with the exchange site, a domain and/or subdomain associated with the exchange site (in other words, where the exchange site is available), the size of the advertisement space or exchange site, an indication whether the content is premium content, an indication whether the advertisement is user-initiated, a price associated with the exchange site, or a topic associated with the advertising medium. The client data can include, among other things, information about the browser (e.g., name, version, state), operating system (e.g., name, version, state), end-user device (e.g., name, model, company), a temporal factor (e.g., time of day, day of week, holiday, etc.), or a geographic location associated with the end-user device. The user data can include, among other things, various data segments determinable from the request. For instance, user data may include demographic information including end-user annual income, gender, geographic location, browsing history, likes and dislikes, etc.

Furthermore, the runtime pre-bid detection component 456 can provide a binary determination that the exchange site associated therewith is currently viewable or not viewable. In some embodiments, a significant amount of weight can be given to the viewable state determined by the runtime pre-bid detection component 456 when determining the impression level performance value. For instance, regardless of what the historical viewability data 456 indicates with regards to viewability of the subject exchange site, if the runtime pre-bid detection component 456 indicates that an exchange site is currently viewable, the bidding component 442 may rely solely on this information to increase the impression level performance value, if the exchange site is in accordance with the advertising campaign's goals.

In other embodiments, however, a distributed amount of weight can be given to both the historical viewability data 456 and the runtime pre-bid viewability data received from the runtime pre-bid detection component 454 when determining the impression level performance value for the exchange site. In more detail, predictor data corresponding to inventory attributes, client data, and user data, as described herein, can be extracted from both sets of data. That is, if a viewability state of an exchange site is determined as viewable, corresponding predictor data can be analyzed by the bidding component 442 to determine whether the information provided therein is in line with the advertiser's advertising campaign goals. Similarly, predictor data extracted from the historical viewability data 456 can be analyzed by the bidding component 442 to also determine whether the information provided therein is in line with the advertiser's advertising campaign goals. It is contemplated that any combination and weight given to any of the aforementioned factors, including predictor data and viewability state, can be considered when determining an impression level performance value. To this end, the impression level performance value can be used to influence the generation of the bid price for placing an advertisement on the exchange site. For example, a low impression level performance value may indicate a low likelihood of viewability for the exchange site subject to the bid. As such, the bid may either be withheld, or lowered to an extent determined by the goals of the advertising campaign. In another example, a high impression level performance value may indicate a high likelihood of viewability for the exchange site subject to the bid. As such, the bid amount may be raised to an extent determined by the goals of the advertising campaign.

Figure 5:
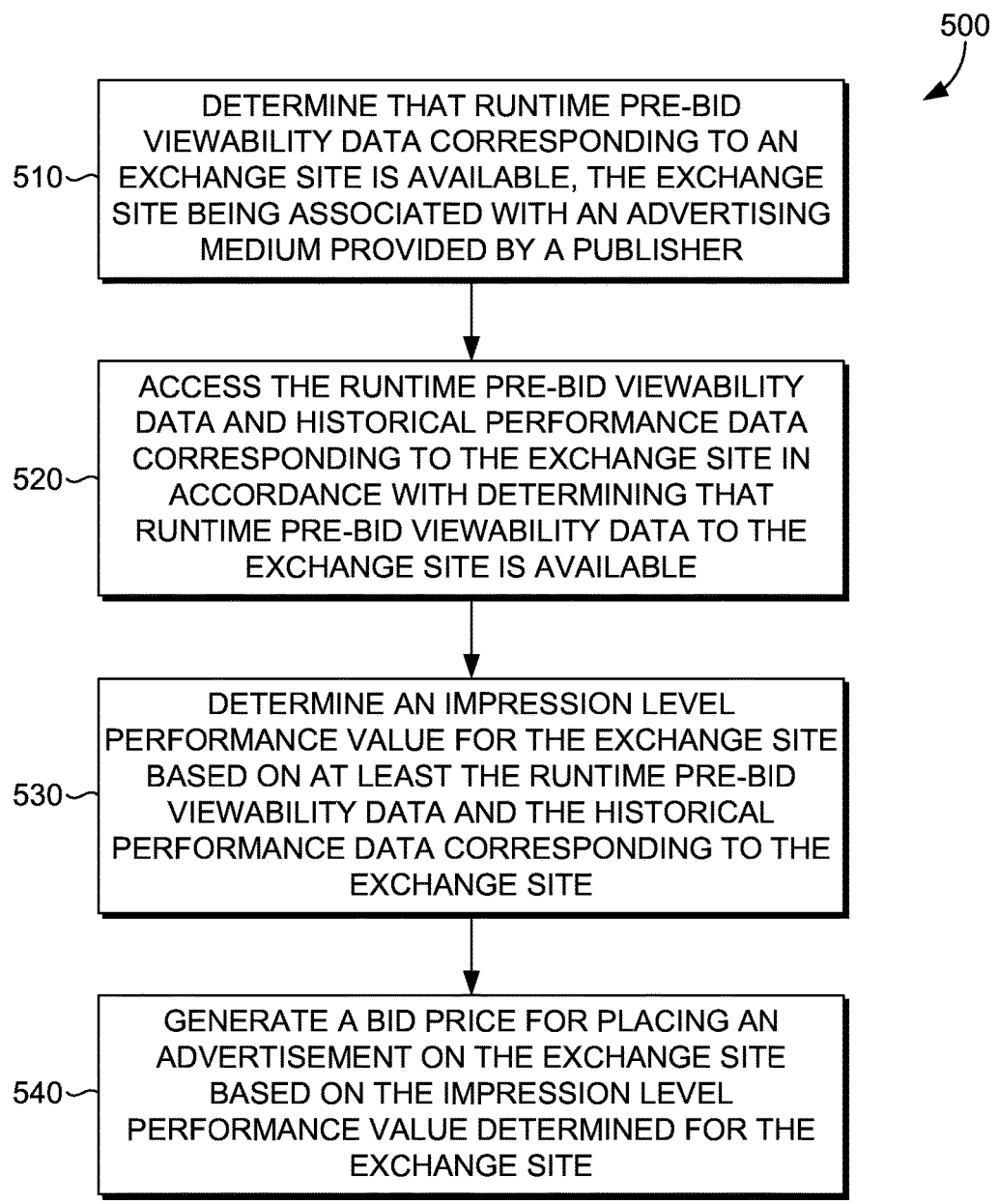
FIG. 5 is a flow diagram showing an exemplary method for optimizing viewability rates by utilizing pre-bid client-side detection in autonomous bid-decisioning for advertising campaigns, in accordance with embodiments described herein.

Turning now to FIG. 5, a flow diagram is provided that illustrates a method 500 for optimizing viewability rates by utilizing pre-bid client-side detection in autonomous bid-decisioning for advertising campaigns. Initially, at block 510, a determination is made that runtime pre-bid viewability data corresponding to an exchange site is available. The exchange site is associated with an advertising medium provided by a publisher, as described in accordance with embodiments of the present disclosure. At block 520, runtime pre-bid viewability data and historical performance data corresponding to the exchange site is accessed in accordance with the determination that runtime pre-bid viewability data to the exchange site is available. At block 530, an impression level performance value for the exchange site based on at least the runtime pre-bid viewability data and the historical performance data corresponding to the exchange site is determined. At block 540, a bid price for placing an advertisement on the exchange site is generated. The generated bid price is based on the impression level performance value determined for the exchange site.

Figure 6:
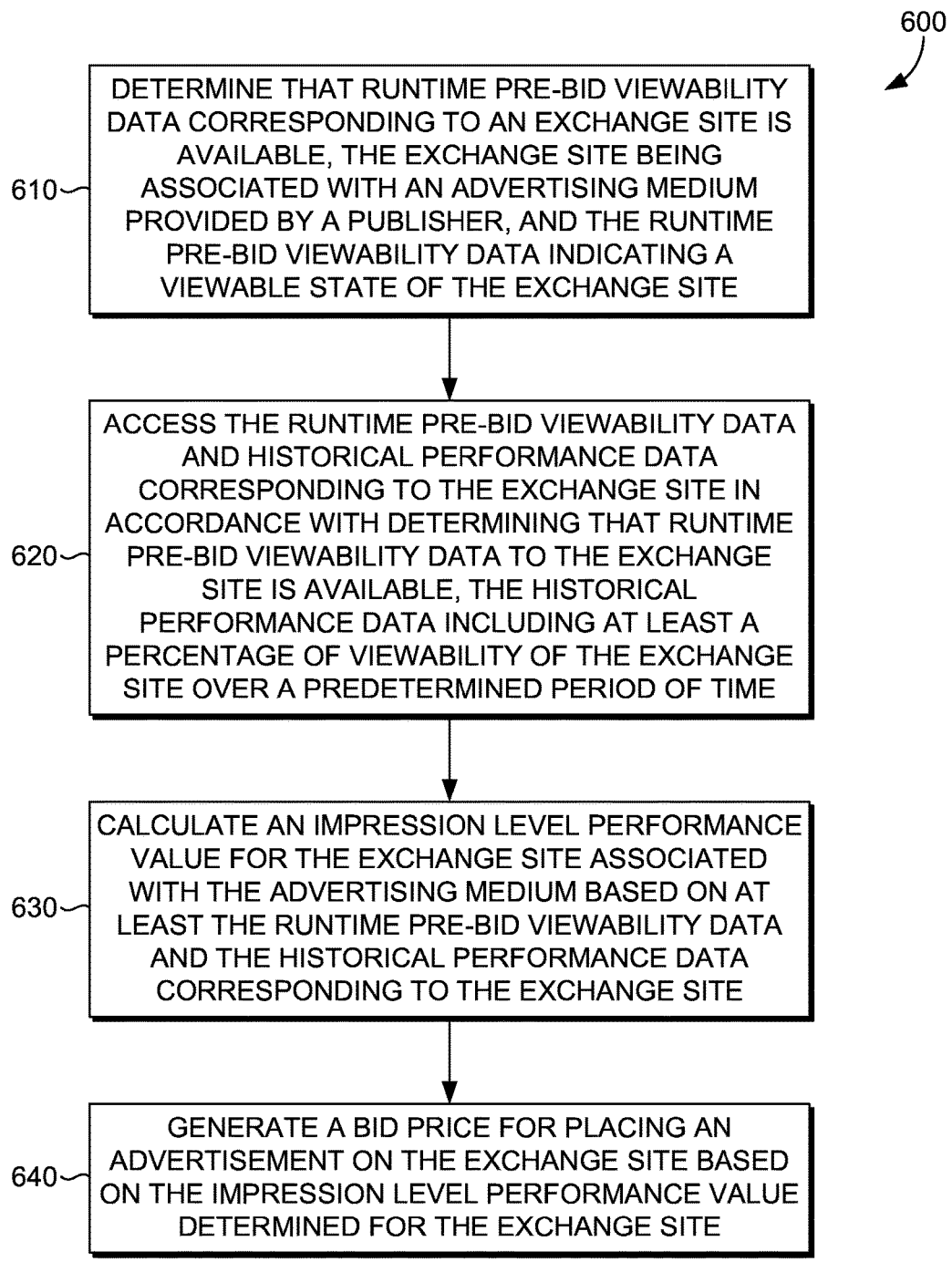
FIG. 6 is a flow diagram showing another exemplary method for optimizing viewability rates by utilizing pre-bid client-side detection in autonomous bid-decisioning for advertising campaigns, in accordance with embodiments described herein.
Figure 7:
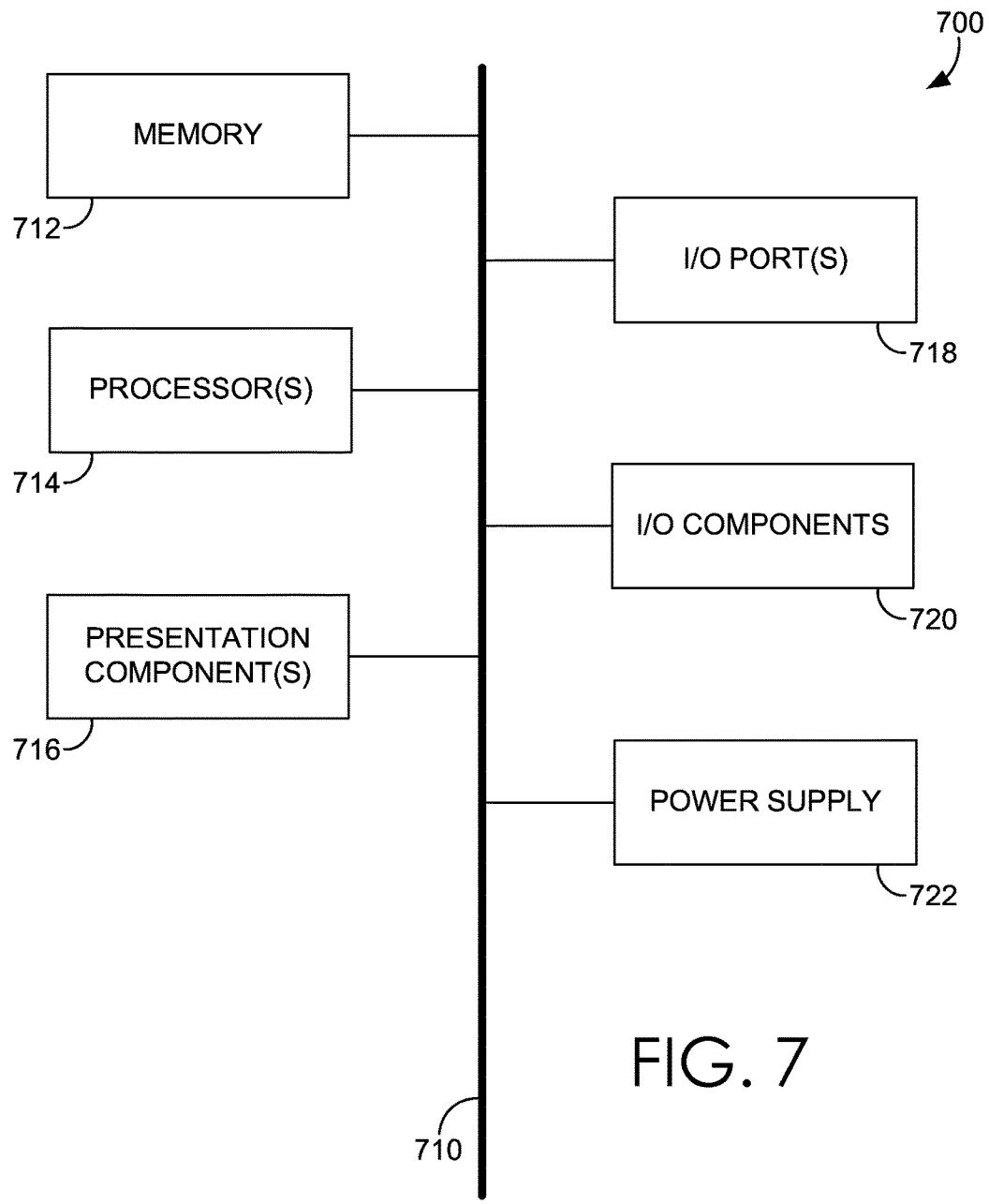
FIG. 7 is a block diagram of an exemplary computing environment suitable for use in implementing embodiments described herein.

Turning now to FIG. 6, a flow diagram is provided that illustrates a method 600 for optimizing viewability rates by utilizing pre-bid client-side detection in autonomous bid-decisioning for advertising campaigns. Initially, at block 610, a determination is made that runtime pre-bid viewability data corresponding to an exchange site is available. The exchange site is associated with an advertising medium provided by a publisher, and the runtime pre-bid viewability data indicates a viewable state of the exchange site, as described in accordance with embodiments of the present disclosure. At block 620, runtime pre-bid viewability data and historical performance data corresponding to the exchange site is accessed in accordance with the determination that runtime pre-bid viewability data to the exchange site is available. The historical performance data includes, among other things, a percentage of viewability of the exchange site over a predetermined duration of time. At block 630, an impression level performance value for the exchange site associated with the advertising medium is calculated based on, among other things, the runtime pre-bid viewability data and the historical performance data corresponding to the exchange site. At block 640, a bid price for placing an advertisement on the exchange site is generated based on the determined impression level Having described embodiments of the present invention, an exemplary operating environment in which embodiments of the present invention may be implemented is described below in order to provide a general context for various aspects of the present invention. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Accordingly, in an embodiment described herein, a system for optimizing viewability rates by utilizing pre-bid client-side detection in autonomous bid-decisioning for advertising campaigns is provided. The system includes one or more processors and one or more computer storage media storing computer-usable instructions that, when used by the one or more processors, causes the one or more processors to determine that runtime pre-bid viewability data corresponding to an exchange site is available. The instructions further cause the one or more processors to access the runtime pre-bid viewability data and historical performance data corresponding to the exchange site in accordance with the determination that runtime pre-bid viewability data to the exchange site is available. The instructions further cause the one or more processors to analyze one or more viewability predictors associated with at least one of the historical performance data and runtime pre-bid viewability data corresponding to the exchange site to calculate an impression level performance value for the exchange site, each of the one or more viewability predictors being one of an inventory attribute, client data, or user data. The instructions further cause the one or more processors to generate a bid price for placing an advertisement on the exchange site based on the calculated impression level performance value.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

Components can be configured for performing novel aspects of embodiments, where configured for comprises programmed to perform particular tasks or implement particular abstract data types using code. It is contemplated that the methods described herein can be performed in different types of operating environments having alternate configurations of the functional components described herein. As such, the embodiments described herein are merely exemplary, and it is contemplated that the techniques may be extended to other implementation contexts.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A computer-implemented method for optimizing viewability rates by utilizing pre-bid client-side detection in autonomous bid-decisioning for an advertising campaign, the method comprising:

determining, at a demand-side platform server, that runtime pre-bid viewability data corresponding to an exchange site is available based on data received from a server-side platform server, wherein the exchange site is included in an advertising medium hosted by a publisher server in communication with the server-side platform server, and the runtime pre-bid viewability data indicates that a predefined threshold percentage of the exchange site is currently displayed at an end-user device via the advertising medium;

accessing, by the demand-side platform server, the determined available runtime pre-bid viewability data and historical performance data corresponding to the exchange site;

determining, by the demand-side platform server, an impression level performance value for the exchange site based at least in part on the accessed runtime pre-bid viewability data and historical performance data; and generating, by the demand-side platform server, a bid to present third-party content on the exchange site based on the determined impression level performance value, the bid being generated for communication to the server-side platform server.

2. The method of claim 1, wherein the exchange site is a predefined area of the advertising medium adapted to present the third-party content.

3. The method of claim 1, wherein the advertising medium is a webpage.

4. The method of claim 1, wherein the predefined threshold percentage is at least fifty percent.

5. The method of claim 1, wherein the server-side platform server is configured to obtain the runtime pre-bid viewability data from the end-user device when the end-user device is presenting at least a portion of the advertising medium.

6. The method of claim 5, wherein the end-user device is configured to employ an application configured to determine the runtime pre-bid viewability data.

7. The method of claim 1, wherein the impression level performance value for the exchange site is determined based further in part on one or more viewability predictors.

8. The method of claim 7, wherein the one or more viewability predictors includes at least one of obtained inventory attributes, end-user device data, and end-user data.

9. The method of claim 1, wherein the historical performance data includes at least a percentage of exchange site viewability over a predetermined period of time.

10. The method of claim 1, wherein the third-party content includes multimedia content.

11. The method of claim 1, wherein the impression level performance value corresponds to a likelihood that the third-party content will be viewed by an end-user of the end-user device.

12. A non-transitory computer storage medium storing computer-useable instructions that, when used by one or more computing devices, cause the one or more computing devices to perform operations comprising:

determining that runtime pre-bid viewability data corresponding to an exchange site is available based on data received from a server-side platform server, wherein the exchange site is included in an advertising medium hosted by a publisher server in communication with the server-side platform server, and the runtime pre-bid viewability data indicating a viewable state of the exchange site, the viewable state being determined by at least fifty percent (50%) of the exchange site being within a currently visible portion of an active browser tab displayed on an end-user device;

accessing the determined available runtime pre-bid viewability data and historical performance data corresponding to the exchange site, the historical performance data including at least a percentage of viewability of the exchange site over a predetermined period of time;

calculating an impression level performance value for the exchange site based at least in part on the accessed runtime pre-bid viewability data and historical performance data; and generating a bid to present third-party content on the exchange site based on the calculated impression level performance value, the bid being generated for communication to the server-side platform server.

13. The medium of claim 12, wherein the viewable state of the exchange site is one of currently-viewable and currently-not viewable.

14. The medium of claim 12, wherein at least one of the runtime pre-bid viewability data and the historical performance data includes one or more viewability predictors that are analyzed when calculating the impression level performance value for the exchange site.

15. The medium of claim 14, wherein the one or more viewability predictors includes at least one of inventory attributes, end-user device data, and data associated with the end-user device.

16. A computerized system comprising:
one or more processors; and
one or more computer storage media storing computer-usable instructions that, when used by the one or more processors, cause the one or more processors to:

determine that runtime pre-bid viewability data corresponding to an exchange site is available based on data received from a server-side platform server, wherein the exchange site is included in an advertising medium hosted by a publisher server in communication with the server-side platform, and wherein the runtime pre-bid viewability data indicates a currently-viewable state of the exchange site currently displayed by an end-user device via the advertising medium;

access the determined available runtime pre-bid viewability data and historical performance data corresponding to the exchange site, the historical performance data including at least a percentage of viewability of the exchange site over a predetermined period of time;

analyzing one or more viewability predictors associated with at least one of the historical performance data and runtime pre-bid viewability data to calculate an impression level performance value for the exchange site, a viewability predictor including one of an inventory attribute end-user device data, or data associated with a user of the end-user device; and generating a bid to present third-party content on the exchange site based on the calculated impression level performance value for the exchange site, wherein the bid is generated for communication to the server-side platform server.

17. The system of claim 16, wherein the inventory attribute includes any one of an exchange site, a sub domain, an exchange site size, a premium content status, an end-user-initiated video, a price of inventory, and a topic, wherein the end-user device data includes any one of a browser, an operating system, a device model, a temporal factor, and a geographical locus, and wherein the data associated with the end-user of the end-user device includes any one of data segments and demographic information.

* * * * *